United States Patent [19]

Noll et al.

[11] 4,190,566

[45] Feb. 26, 1980

[54] WATER-DISPERSIBLE POLYURETHANES

[75] Inventors: Klaus Noll; Josef Pedain, both of Cologne, Fed. Rep. of Germany

[73] Assignee: Bayer Aktiengesellschaft, Leverkusen, Fed. Rep. of Germany

[21] Appl. No.: 746,919

[22] Filed: Dec. 2, 1976

[51] Int. Cl.$^2$ .................... C08L 75/12; C08G 18/78; C08L 75/08

[52] U.S. Cl. ............................ 260/29.2 TN; 528/76; 528/79; 528/80

[58] Field of Search ............... 260/29.2 TN, 77.5 AQ, 260/77.5 AT, 77.5 AM, 75 NQ, 75 NT, 75 NP; 528/76, 79, 80

[56] References Cited

U.S. PATENT DOCUMENTS

| | | | |
|---|---|---|---|
| 3,796,678 | 3/1974 | Bartizal | 260/29.2 TN |
| 3,894,131 | 7/1975 | Speech | 260/29.2 TN |
| 3,905,929 | 9/1975 | Noll | 260/77.5 AQ |
| 3,920,598 | 11/1975 | Reiff et al. | 260/77.5 AQ |
| 3,935,146 | 1/1976 | Noll et al. | 260/77.5 AQ |

OTHER PUBLICATIONS

Dieterich et al., J. Oil Col. Chem. Assoc. (1970), 53, pp. 363-379.
Dieterich et al., Advances in Urethane Science & Technology, vol. 4, Technomic Publishing Co., pp. 112-130.

*Primary Examiner*—H. S. Cockeram
*Attorney, Agent, or Firm*—Gene Harsh; Lawrence S. Pope

[57] ABSTRACT

The present invention relates to non-ionic, water-dispersible polyurethanes having a substantially linear molecular structure and lateral polyalkylene oxide polyether chains containing ethylene oxide units characterized in that from about 40 to 95% of the alkylene oxide units of the lateral polyalkylene oxide polyether chains consist of ethylene oxide units and from about 5 to 60% consist of propylene oxide, butylene oxide or styrene oxide, to aqueous dispersions of these non-ionic, water-dispersible polyurethanes and to processes for producing these non-ionic, water-dispersible polyurethanes.

9 Claims, No Drawings

WATER-DISPERSIBLE POLYURETHANES

BACKGROUND OF THE INVENTION

Aqueous dispersions of polyurethanes or polyurethane ureas have long been known (cf., for example, Angewandete Chemie, 82, (1970) pages 53 to 63; DT-OS Nos. 2,314,512; 2,314,513 or 2,320,719 and U.S. Pat. Nos. 3,920,598, 3,935,146 and 3,905,929) and have a high quality level.

Not least the fact that many of these dispersions are free from emulsifiers contributes towards this high level. They contain chemically incorporated hydrophilic centers which impart self-emulsifiability to the otherwise hydrophobic elastomers. This method of producing self-emulsifiability has two principal advantages over the use of emulsifiers:

(1) less hydrophilic centers are required.
(2) the emulsifier incorporated is unable to migrate from shaped articles produced from elastomer dispersions of this type. As a rule, behavior of this type has a considerable effect upon the property spectrum.

The first feature in particular considerably reduces the sensitivity to water of shaped articles produced from self-emulsified polyurethanes. The hydrophilic centers incorporated into known water-dispersible polyurethanes and polyurethane ureas may represent both salt-like, i.e. ionic groups and also hydrophilic non-ionic groups.

The above-mentioned non-ionic, water-dispersible polyurethanes include, in particular, the polyurethanes and polyurethane ureas containing lateral polyethylene oxide chains according to DT-OS Nos. 2,314,512; 2,314,513 and 2,320,719 and U.S. Pat. Nos. 3,920,598, 3,935,146 and 3,905,929.

The non-ionic polyurethane dispersions described in these prior publications are eminently suitable for the production of mechanically strong, highly elastic coatings. Both non-flexible substrates, such as wood and metals, and also flexible substrates, such as textiles or leather may be coated with the dispersions. One preferred field of application is the coating of textiles. However, it has been found that in certain cases, especially in cases where high-gloss transfer papers are used, coated textiles produced using these polyurethanes show a phenomenon which may seriously restrict their commercial value. This phenomenon is the appearance of a coating which becomes increasingly dull in the event of prolonged storage. High-gloss, dark-pigmented or colored coatings in particular show a speckled, matt-grey appearance after from 3 to 6 weeks which seriously affects the optical appearance of the sheet-form material. Although this undesirable phenomenon may be eliminated by wiping with a damp cloth, it reappears after a certain time.

Accordingly, an object of the present invention is to provide non-ionic, water-dispersible polyurethanes which may be used for the production of textile coatings which do not show the unfavorable phenomenon referred to above. According to the present invention, this object may surprisingly be achieved by incorporating certain quantities of other alkylene oxide units in addition to ethylene oxide units into the polyether side chains which are responsible for the dispersibility of the polyurethanes.

SUMMARY OF THE INVENTION

Accordingly, the present invention relates to non-ionic, water-dispersible polyurethanes having a substantially linear molecular structure and lateral polyalkylene oxide polyether chains containing ethylene oxide units which are responsible for dispersibility, distinguished by the fact that, based on the number of alkylene oxide units, from about 40 to 95% of the alkylene oxide units of the lateral polyalkylene oxide polyether chains consist of ethylene oxide units and from about 5 to 60% of propylene oxide, butylene oxide or styrene oxide units.

The present invention also relates to aqueous dispersions of these polyurethanes.

Furthermore, the present invention also relates to the preferred process for producing these water-dispersible polyurethanes by reacting organic diisocyanates with difunctional organic compounds ("difunctional" in the context of the isocyanate polyaddition reaction) containing terminal isocyanate-reactive hydrogen atoms and having a molecular weight of from about 300 to 6000 in the presence of synthesis components containing hydrophilic groups which guarantee the dispersibility of the polyurethanes, and optionally in the presence of the chain extenders known in polyurethane chemistry having a molecular weight below about 300 and optionally in the presence of the additives and aids normally used in polyurethane chemistry, distinguished by the fact that the synthesis components containing hydrophilic groups are diols corresponding to the following general formula:

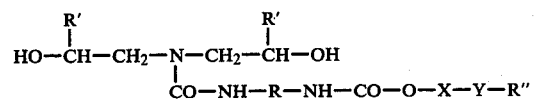

and/or diisocyanates corresponding to the following general formula:

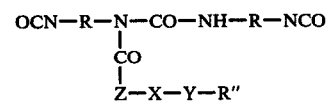

wherein
R—represents a difunctional radical of the type obtained by removing the isocyanate groups from a diisocyanate having a molecular weight of from about 112 to 1000,
R'—represents a hydrogen atom or a monofunctional hydrocarbon radical having from 1 to 8 carbon atoms,
X—represents a difunctional radical obtained by removing the terminal oxygen atom from a polyalkylene oxide radical having from about 5 to 90 alkylene oxide units of which, based on their number, of which from about 40 to 95% consist of ethylene oxide units and from about 5 to 60% of propylene oxide, butylene oxide or styrene oxide units,
Y—represents oxygen or —NR'''— and
R'' and R''', which may be the same or different, each represent monofunctional hydrocarbon radicals having from 1 to 12 carbon atoms,
Z—represents a radical which has the same definition as Y.

DETAILED DESCRIPTION OF THE INVENTION

Organic diisocyanates suitable for use in the preferred process described above for producing the polyurethane elastomers according to the present invention are organic diisocyanates corresponding to the general formula:

$$R(NCO)_2$$

wherein R represents an organic radical of the type obtained by removing the isocyanate groups from an organic diisocyanate having a molecular weight of from about 112 to 1000 and preferably from about 140 to 400.

Diisocyanates particularly preferred for the process according to the present invention are those corresponding to the above general formula, wherein R represents a difunctional aliphatic hydrocarbon radical having from 4 to 18 carbon atoms, a difunctional cycloaliphatic hydrocarbon radical having from 5 to 15 carbon atoms, a difunctional aromatic hydrocarbon radical having from 6 to 15 carbon atoms or an araliphatic hydrocarbon radical having from 7 to 15 carbon atoms.

Typical representatives of organic diisocyanates preferably used for the process according to the present invention are, for example, tetramethylene diisocyanate, hexamethylene diisocyanate, dodecamethylene diisocyanate, cyclohexane-1,3- and 1,4-diisocyanate, 1-isocyanato-3-isocyanatomethyl-3,5,5-trimethyl cyclohexane, 4,4′-diisocyanato dicyclohexyl methane, aromatic diisocyanates, such as 2,4-diisocyanato toluene, 2,6-diisocyanato toluene, mixtures of these isomers, 4,4′-diisocyanato diphenyl methane, 1,5-diisocyanato naphthalene or p-xylylene diisocyanate.

Difunctional compounds (in the context of the isocyanate polyaddition reaction) containing terminal isocyanate-reactive groups and having a molecular weight of from about 300 to 6000, preferably from about 500 to 3000, which are suitable for use in accordance with the present invention are, in particular:

(1) The dihydroxy polyesters, known in polyurethane chemistry, of dicarboxylic acids, such as succinic acid, adipic acid, suberic acid, azelaic acid, sebacic acid, phthalic acid, isophthalic acid, terephthalic acid, tetrahydrophthalic acid, etc., and diols, such as ethylene glycol, 1,2-propylene glycol, 1,3-propylene glycol, diethylene glycol, 1,4-butane diol, 1,6-hexane diol, 1,8-octane diol, neopentyl glycol, 2-methyl-1,3-propane diol, or the various isomeric bis-hydroxy methyl cyclohexanes;

(2) The polylactones known in polyurethane chemistry such as the polymers of ε-caprolactone started on the above-mentioned dihydric alcohols;

(3) The polycarbonates known in polyurethane chemistry of the type which may be obtained by reacting the above-mentioned diols, for example, with diaryl carbonates or phosgene;

(4) The polyethers known in polyurethane chemistry, such as the polymers and copolymers of styrene oxide, propylene oxide, tetrahydrofuran, butylene oxide or epichlorhydrin, produced with difunctional starter molecules, such as water, the above-mentioned diols or amines containing 2 N-H-bonds. It is also possible to use ethylene oxide, provided that the polyether used contains a maximum of about 10%, by weight, of ethylene oxide. In general, however, polyethers obtained without ethylene oxide are used;

(5) The polythioethers, polythio mixed ethers, polythio ether esters known in polyurethane chemistry;

(6) The polyacetals known in polyurethane chemistry, for example of the above-mentioned diols and formaldehyde; and (7) Difunctional polyether esters containing terminal isocyanate-reactive groups;

(8) Polyamides and polyester amides containing terminal hydroxyl and/or primary or secondary amino groups of the type described in DT-OS No. 2,320,719.

Dihydroxy polyesters, dihydroxy polylactones, dihydroxy polyethers and dihydroxy polycarbonates are preferably used in the process according to the present invention.

Basically, however, the compounds according to the present invention could also be produced without the use of relatively high molecular weight polyhydroxyl compounds, i.e. solely from diisocyanates and low molecular weight reactants (molecular weight <300).

Chain extenders having a molecular weight below about 300 suitable for use in the process according to the present invention for producing the self-dispersible polyurethanes are, for example, the low molecular weight diols described with reference to the production of the dihydroxy polyesters or even diamines, such as diaminoethane, 1,6-diaminohexane, piperazine, 2,5-dimethyl piperazine, 1-amino-3-aminomethyl-3,5,5-trimethyl cyclohexane, 4,4′-diaminodicyclohexyl methane, 1,4-diaminocyclohexane, 1,2-propylene diamine or even hydrazine, amino acid hydrazides, hydrazides of semicarbazido carboxylic acids, bis-hydrazides and bis-semicarbazides.

In addition to the above-mentioned difunctional synthesis components ("difunctional" in the context of the isocyanate polyaddition reaction), it is also possible in certain cases, i.e., where weak branching of the polyurethanes is required, to use small proportions of the trifunctional and higher functional synthesis components known in polyurethane chemistry, such as for example tris-(isocyanathexyl)-biuret, triphenylmethane-triisocyanate, glycerol, trimethylolpropane or pentaerythritol.

Hydrophilic synthesis components having lateral hydrophilic chains containing ethylene oxide units corresponding to the following general formula:

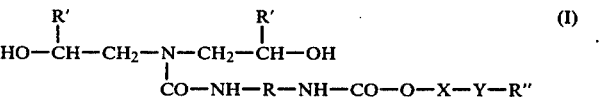

(I)

and/or to the general formula:

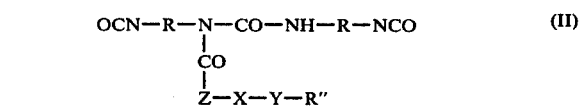

(II)

are used in the process according to the present invention.

Particularly preferred synthesis components are those corresponding to general formula (I) above.

In general formula (I) and (II) above,

R—represents a difunctional radical of the type obtained by removing the isocyanate groups from a diisocyanate corresponding to the general formula R(NCO)$_2$ of the type mentioned above, R'—represents a hydrogen atom or a monofunctional hydrocarbon radical having from 1 to 8 carbon atoms, preferably a hydrogen atom or a methyl group, R"—represents a monofunctional hydrocarbon radical having from 1 to 12 carbon atoms, preferably an unsubstituted alkyl radical having from 1 to 4 carbon atoms, X—represents a difunctional radical obtained by removing the terminal oxygen atom from a polyalkylene oxide radical having from about 5 to 90 and preferably from about 20 to 70 chain members, of which from about 40 to 95% and preferably from about 60 to 90% consists of ethylene oxide units and from about 5 to 60%, preferably from about 10 to 40%, of propylene oxide, butylene oxide or styrene oxide units, of which propylene oxide units are preferred.

Y—represents oxygen or —NR'"— wherein R'" has the same definition as R",

X—represents a radical which has the same definition as Y.

The compounds corresponding to general formula (I) and (II) above may be produced by the methods according to DT-OS Nos. 2,314,512 and 2,314,513 and U.S. Pat. Nos. 3,935,146, 3,920,598 and 3,905,929 said U.S. Patents incorporated herein by reference. In addition to the disclosures of these two Offenlegungsschrifts and the U.S. Patents, it is pointed out that, instead of using the monofunctional polyether alcohols mentioned therein as starting materials, it is also possible to use those of the type, only from about 40 to 95% and preferably from about 60 to 90% of whose polyether segment consists of ethylene oxide units and from about 5 to 60%, preferably from about 10 to 40%, of propylene oxide, butylene oxide or styrene oxide units, of which the propylene oxide units are preferred.

The process according to the present invention for producing the self-dispersible polyurethanes may be carried out in accordance with the methods known in polyurethane chemistry both by the one-stage process and also by the two-stage process (prepolymer process).

For producing the self-dispersible polyurethanes, the reactants are used in an equivalent ratio of isocyanate groups to isocyanate-reactive groups of from about 0.8:1 to 2.5:1, preferably from about 0.95:1 to 1.5:1. The use of an NCO-excess naturally results in the formation of compounds containing NCO-groups which, when converted into an aqueous dispersion, react further with the water, accompanied by chain extension, to form the dispersed end product. Accordingly, the above equivalent ratio embodies all the components involved in the synthesis of the polyurethanes according to the present invention, including the amino-group-containing chain extender optionally used in the form of aqueous solutions, but not the proportion of water used for dispersing the polyurethanes which reacts with any NCO-group-containing compounds present in a chian-extending reaction.

Both the one-stage process and the two-stage process may be carried out in the presence or absence of solvents. Suitable solvents, especially if, as described below, it is intended to convert the polyurethanes into an aqueous dispersion during or after their production, are, for example, water-miscible solvents that are inert with respect to isocyanate groups and which boil at temperatures below about 100° C., such as acetone or methyl ethyl ketone.

For carrying out the one-stage process, the difunctional compounds containing terminal isocyanate-reactive groups and having molecular weights of from about 300 to 6000 mentioned under (1) to (8) above are optionally mixed with the hydrophilic synthesis component (I) and with the chain extender used, if any, having a molecular weight below about 300. The diisocyanate component which contains the above-mentioned diisocyanates without hydrophilic groups and, optionally hydrophilic diisocyanates (II), in the absence of solvents, is then added to the above obtained mixture, after which the reaction mixture is reacted, preferably at temperatures of from about 50° to 150° C., and optionally after the addition of catalysts known in polyurethane chemistry, such as for example tin-II-octoate, dibutyltindilaurate or triethylene diamine. The quantity in which the diisocyanate components are used is such that an NCO:OH ratio of from about 0.8 to 1.05 prevails. During the reaction, the viscosity of the reaction mixture increases so that one of the above-mentioned solvents is gradually added to the mixture. Finally, an organic solution of the fully reacted polyurethane is obtained, its concentration preferably being adjusted to from about 10 to 70%, by weight, and more especially to from about 15 to 55%, by weight, expressed as solids.

In that case, the dissolved polyurethane elastomers are best converted into an aqueous dispersion by adding water to the stirred solution. In many cases, the solution passes through the phase of a water-in-oil emulsion, after which it changes into an oil-in-water emulsion, simultaneously overcoming a viscosity maximum. Removal of the solvent by distillation leaves behind a pure aqueous stable dispersion.

For carrying out the two-stage process, an NCO-prepolymer is preferably initially prepared in the melt from excess diisocyanate, relatively high molecular weight compounds with isocyanate-reactive groups of the type mentioned by way of example in (1) to (8) above and hydrophilic synthesis component (I), maintaining an NCO/OH ratio of from about 1.1:1 to 3.5:1, preferably from about 1.2:1 to 2.5:1, in the absence of solvents or even in the presence of solvents. Where it is prepared in the absence of solvents, the NCO-prepolymer thus prepared is subsequently dissolved for example in a suitable solvent. The solution of the prepolymer thus obtained may then be reacted in known manner with the chain extender having a molecular weight below about 500 of the type mentioned by way of example above.

To prepare the polyurethane dispersions according to the present invention, it is particularly recommended to adopt a particular variant of the two-stage process in which water or a water/solvent mixture is added in small quantities to the described solution of the NCO-prepolymer with the solution of the chain extender (in this case the above-mentioned diamines and hydrazine derivatives are preferably used as chain extenders) in such a way that the NCO:NH ratio is from about 2.5 to 1.05. This reaction may be carried out at room temperature or even, preferably, at temperatures of from about 25° to 60° C. By subsequently adding the rest of the water and removing the solvent, the polyurethane dispersion is finally obtained. However, it is also possible in this embodiment of the process to dissolve the chain extender in the total quantity of the water finally present in the dispersion (from about 50 to 200%, by weight, based on solid polyurethane).

However, the two-stage process described above may also be carried out in the absence of solvents without any real difficulties by preparing the described NCO-prepolymer in solvent-free form and stirring it as a melt into the water. In this case, too, the above-mentioned chain extenders containing amino groups may be used in solution in the water.

The water-dispersible polyurethane elastomers according to the present invention are of predominantly linear molecular structure and are characterized by a content of ethylene oxide incorporated laterally within a polyalkylene oxide chain of from about 3 to 30%, by weight, preferably from about 4 to 20% by weight, from about 40 to 95% and preferably from about 60 to 90% of the alkylene oxide segments of the lateral polyalkylene oxide polyether chain, based on the number of alkylene oxide units, consisting of ethylene oxide units, and from about 5 to 60%, preferably from about 10 to 40% of propylene oxide, butylene oxide or styrene oxide units, preferably propylene oxide units. Accordingly, when the process according to the present invention as described above is carried out in practice, the type and quantity of hydrophilic synthesis components (I) and (II) are selected in such a way that the end product satisfies these requirements. It does not matter whether the lateral polyether chain is a mixed polyether chain having statistical distribution of the alkylene oxide segments or a block polyether chain.

The lateral polyalkylene oxide chain which contains the ethylene oxide units essential to the present invention is preferably attached through groups:

(i) corresponding to the following general formula:

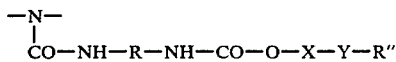

or (ii) corresponding to the following general formula:

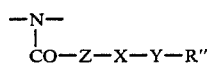

wherein
R, R'', R''', X, Y and Z are as defined above.

The process according to the present invention as described above merely represents the preferred method, but by no means the only method of obtaining the polyurethanes according to the present invention. Another method of obtaining the polyurethanes according to the present invention is, for example, to introduce the non-ionic lateral hydrophilic groups into a preferably linear polyurethane elastomer by reacting this elastomer with hydrophilic monoisocyanates corresponding to the following general formula:

wherein
R, X, Y, R'' and R''' are as defined above.

Hydrophilic monoisocyanates of this type may be produced by an analogous process to that described in DT-OS No. 2,314,512, although it is pointed out in addition to the disclosure of that Offenlegungsschrift that, instead of using the monofunctional polyether alcohols mentioned there as starting materials, it is also possible to use those of which the polyether segment, in addition to ethylene oxide units, also contains up to about 60%, by weight, and preferably up to about 40%, by weight, of propylene oxide units, butyl oxide units or styrene oxide units, preferably propylene oxide units.

In cases where the polyurethanes according to the present invention are produced using these hydrophilic monoisocyanates, a linear polyurethane is preferably prepared from the above-mentioned starting materials preferably using an equivalent ratio of isocyanate groups to isocyanate-reactive groups of about 1:1, the linear polyurethane thus prepared containing no lateral hydrophilic polyether segments. This linear polyurethane elastomer is then reacted in the melt or in a suitable solvent, for example of the type mentioned above, with the hydrophilic monoisocyanates at from about 50° to 150° C., producing an addition of the isocyanate group of the hydrophilic monoisocyanate to the active hydrogen atoms of the urethane and/or urea groups present in the linear polyurethane.

The polyurethane according to the present invention thus obtained, either in the form of a melt or in the form of a solution, may then be converted into an aqueous dispersion by mixing with water and distilling off the auxiliary solvent used, if any.

Generally, the polyurethanes according to the present invention may be converted into aqueous dispersions by any methods including, for example, dispersion in the absence of solvents, for example by mixing the polyurethane melt with water in an apparatus which is able to generate high shear gradients, and the use of very small quantities of solvent for plasticization during processing in the same apparatus, and also the use of non-mechanical dispersion aids, such as soundwaves of extremely high frequency. Finally, in the case of polyurethane ureas too, chain extension may be carried out after the prepolymer has been converted into an aqueous emulsion. However, it is also possible to use simple mixers, for example, stirrer-equipped vessels or so-called "flow mixers", because the polyurethanes according to the present invention are self-dispersible.

The polyurethanes dispersed in accordance with the present invention have an average particle size of from about 10 mµ to 5µ, preferably from about 200 to 800 mµ. Naturally, the optical dispersion or Tyndall effect begins to appear in the case of dispersions having particle sizes below about 500 mµ. If the lateral polyethylene oxide segment content of the polyurethane solid is below about 5%, it is also possible to obtain average particle diameters of from about 5 to approximately 50µ. Dispersions of this type are of interest, for example, for the production of polyurethane powders.

The flow behavior of the dispersions, which it is not intended to discuss in detail here, is govered by particle size and concentration. In the case of relatively small particles, viscosity increases, in addition to which an increasingly higher flow limit occurs below a particle size of approximately 100 mµ (Bingham substance). Irrespective of this dependence, viscosity increases with increasing concentration which, with this class of dispersions, may amount to as much as 70%, in some cases up to a level of 50 P.

The dispersions are not sensitive to electrolytes. This provides, for example, for the acid-catalyzed crosslinking of the latex particles with formaldehyde or formaldehyde derivatives; similarly they may be pigmented with electrolyte-active pigments or dyes. Another property of the dispersions according to the present invention is the fact that they may be coagulated under heat which makes them suitable for processing into films permeable to water vapor simply by heating.

The dispersions may be blended with other dispersions, for example with polyvinyl acetate, polyethylene, polystyrene, polybutadiene, polyvinyl chloride, polyacrylate and copolymer plastics dispersions. The addition of known chemically non-fixed, preferably ionic emulsifiers is also possible, but, of course, not essential.

Finally, fillers, plasticizers, pigments, carbon black and silica sols, aluminum, clay and asbestos dispersions may also be incorporated into the dispersions.

The dispersions of the polyurethane compositions in water are generally stable, storable and transportable and may be processed at any later stage, for example by forming. In general, they dry directly into dimensionally stable plastics coatings, although forming of the end products may also be carried out in the presence of known crosslinking agents. Polyurethanes having different properties may be obtained according to the chemical composition selected and to the urethane group content. Thus, it is possible to obtain soft tacky compositions and thermoplastic and elastomeric products having a variety of different hardnesses up to glass-hard duroplasts. The hydrophilicity of the products may also vary within certain limits. The elastic products may be thermoplastically processed at elevated temperatures, for example at from about 100° to 180° C., providing they are not chemically crosslinked.

The end products of the process are suitable for coating and impregnating woven and non-woven textiles, leather, paper, wood, metals, ceramics, stone, concrete, bitumen, rigid fibers, straw, glass, procelain, plastics of a variety of different types, glass fibers, for anti-static and crease-resistant finishing, as binders for non-wovens, adhesives, adhesion promoters, laminating agents, hydrophobizing agents, plasticizers, binders; for example for cork powder or sawdust; glass fibers, asbestos, paper-like materials, plastics or rubber waste, ceramic materials, as auxiliaries in textile printing and in the paper industry, as additives to polymers; as sizing agents, for example for glass fibers; and for finishing leather.

The dispersions or pastes are preferably applied to a porous substrate which subsequently remains bonded to the end product, such as woven or non-woven textile structures and fiber mats, felts or non-wovens, also paper webs, foam sheets or split leather which, by virtue of their absorbing action, cause the coating to harden immediately. This is followed by drying and, optionally, pressing at elevated temperature. However, drying may also be carried out on smooth porous or non-porous materials, for example, metal glass, paper, cardboard, ceramic materials, sheet steel, silicone rubber, aluminum foil, the end sheet structure subsequently being lifted off and used as such or applied to a substrate using the reversal process by bonding, flame lamination or calendering. Application by the reversal process may be carried out at any time.

The properties of the end products may be modified by using vinyl polymers or active or inactive fillers. It is possible to use, for example, polyethylene, polypropylene, polyvinyl acetate, ethylene-vinyl acetate copolymers, which may optionally be (partially) hydrolyzed and/or grafted with vinyl chloride, styrene-butadiene copolymers, ethylene (graft) copolymers, polyacrylates, carbon black, silica, asbestos, talcum, kaolin, titanium dioxide and glass in the form of powder or in the form of fibers or cellulose. Depending upon the required property spectrum and the application envisaged for the end products, up to about 70%, based on total dry substance, of these fillers may be present in the end product.

Dyes, pigments, plasticizers or additives which influence the flow properties may, of course, also be added.

Drying of the products obtained by various application techniques may be carried out either at room temperature or at elevated temperature. The drying temperature to be selected in each individual case, which is governed not only by the chemical composition of the material, but above all by moisture content, the drying time and the layer thickness, is readily determined by a preliminary test. For a given heating time, the drying temperature must always be below the solidification temperature.

The sheet structures may then be coated with a finish in order to increase their surface resistivity. Aqueous dispersions or solutions are again preferably used for this purpose.

Extremely rigid polyurethanes obtained from finely divided dispersions and sols are suitable for use as stoving lacquers and, in some cases, even as air-drying lacquers. They combine extreme hardness and elasticity with high gloss and, in cases where aliphatic diisocyanates are used, favorable light stability and weather resistance.

The polyurethanes according to the present invention differ from the polyurethanes according to DT-OS No. 2,314,512 in the surprising fact that textile coatings which have been produced from aqueous dispersions thereof do not show any tendency to form a dull surface, even in the event of prolonged storage.

EXAMPLES

EXAMPLE 1

(A) 840 parts of 1,6-hexane diisocyanate are added to 1800 parts of a polyether haing an OH number of 31, produced in the conventional way from n-butanol and ethylene oxide and propylene oxide in a molar ratio of 83:17, followed by stirring for 3 hours at 100 ° C. The reaction mixture then has an NCO content of 14.3%, by weight. 670 parts of 1,6-hexane diisocyanate are recovered by distillation in a vacuum of from 0.05 to 0.1 Torr at a temperature of 120° C. 105 parts of bis-(2-hydroxyethyl)-amine are then introduced, after which the entire quantity of the isocyanate preadduct is stirred in slowly at a temperature of from 25° to 30° C. On completion of the addition, the mixture is stirred for another 30 minutes. On cooling the reaction product remains liquid. After standing for 2 months, a slight haze is formed, although it may readily be eliminated by gentle heating. The product has an OH number of 55.

(B) 1840 parts of a 1,6-hexane diol polycarbonate having an OH number of 56 are dehydrated for 30 minutes at 100° C./14 Torr. After cooling to approximately 70° C., followed by the addition of 160 parts of the adduct described in (A), a mixture of 244 parts of 3-isocyanatomethyl-3,5,5-trimethyl cyclohexyl isocyanate and 185 parts of 1,6-hexane diisocyanate is added, the temperature again increased with stirring to 100° C. and maintained at that level for about 3 hours. The mixture then has an NCO-content of 4.14%, by weight. After cooling to 60°0 C., 4000 parts of anhydrous acetone are stirred in.

102 parts of 3-aminomethyl-3,5,5-trimethyl cyclohexyl amine are dissolved in 200 parts of water and the resulting solution slowly added with thorough stirring to the prepolymer solution cooled to room temperature. After stirring for 10 minutes, 15 parts of hydrazine monohydrate are added all at once, followed by stirring for another 15 minutes. 2345 parts of water are then introduced into the mixture with vigorous stirring. A dispersion of the solid in a water/acetone mixture is formed. The acetone present in this mixture is removed by distillation, leaving behind a bluish-white aqueous dispersion of the solid in a concentration of about 50%. The solid contains about 4.96%, by weight, of ethylene oxide incorporated within lateral polyether chains.

EXAMPLE 2 (Comparision Example)

Following the procedure described in Example 1 (B), an aqueous dispersion of a polyurethane urea is prepared from the following starting materials:
1880 parts of the hexane diol polycarbonate according to Example 1,
135 parts of an adduct according to Example 1(A) of 1 mole of an n-butanol-started polyethylene oxide polyether having an OH number of 28, 1 mole of 1,6-hexane diisocyanate and 1 mole of bis-(2-hydroxyethyl)-amine,
244 parts of 3-isocyanato methyl-3,5,5-trimethyl cyclohexyl isocyanate,
185 parts of 1,6-hexane diisocyanate,
102 parts of 3-aminomethyl-3,5,5-trimethyl cyclohexyl amine,
15 parts of hydrazine monohydrate,
2561 parts of water.

The dispersion has a solids content of about 50%. The solid contains about 4.63%, by weight, of ethylene oxide incorporated within lateral polyether chains.

The dispersions according to Examples 1 and 2 are poured into metal molds so that, following evaporation of the water and heating for 30 minutes to 120° C., clear sheet structures measuring 25×25×0.5 cm are obtained. After storage for 3 weeks at room temperature, the surface of the molding produced from the dispersion of Example 2 is dull and speckled, while the other molding has a glossy surface. If the Example 2 molding is heated for 10 minutes to 50° C., the haze disappears, but reappears after storage for 24 hours at room temperature. If its surface is wipped with a moist sponge and dried, it has a smooth glossy appearance like the molding according to Example 1. However, the cloudy surface haze reappears after storage for 3 weeks at room temperature.

EXAMPLE 3

(A) 1165 parts of 2,4-diisocyanato toluene are added to 1500 parts of a polyether having an OH number of 25, produced in the conventional way from n-butanol and ethylene oxide and propylene oxide in a molar ratio of 71:29, followed by heating for 5 hours to 100° C. in the presence of 2.7 parts of 4-toluene sulphonic acid methyl ester and 0.13 parts of zinc acetyl acetonate. Following the addition of 0.7 parts of benzoyl chloride, 2665 parts of a solution of an allophanate diisocyanate in 2,4-diisocyanato toluene having an NCO-content of 17.8% are obtained. The polyethylene oxide content amounts to about 35.5 %, by weight.

(B) 2000 parts of a polyester diol of ethylene glycol and adipic acid having an OH number of 56 are dehydrated for 30 minutes at 100° C./14 Torr. After cooling to 70° C., 472 parts of the solution described in (A) and 174 parts of 2,4-diisocyanatotoluene are added and the mixture stirred for 3 hours at that temperature. Thereafter the mixture has an NCO-content of 3.17%, by weight. After cooling to 60° C., 4170 parts of anhydrous acetone are stirred in. 39 parts of diaminoethane are dissolved in 127 parts of water and the resulting solution slowly added with thorough stirring to the prepolymer solution cooled to room temperature. After stirring for 10 minutes, 4000 parts of water are added with vigorous stirring. A dispersion of the solid in a water/acetone mixture is formed. The acetone is removed by distillation, leaving behind a bluish-white, aqueous dispersion of the solid in a concentration of about 40%. The solid contains about 6.14%, by weight, of ethylene oxide incorporated within lateral polyether chains.

EXAMPLE 4 (Comparison Example)

(A) 1305 parts of 2,4-diisocyanatotoluene are added to 1500 parts of an n-butanol-started polyethylene oxide alcohol having an OH number of 28, followed by heating for 5 hours to 100° C. in the presence of 2.7 parts of 4-toluene sulphonic acid methyl ester and 0.13 part of zinc acetyl acetonate. Following the addition of 0.7 part of benzoyl chloride, 2805 parts of a solution of an allophanate diisocyanate in 2,4-diisocyanatotoluene having an NCO-content of 20% is obtained. The polyethylene oxide content amounts to about 68.6%.

(B) Following the procedure of Example 3(B) an aqueous dispersion is prepared from the following starting materials:
2000 parts of a polyester diol of ethylene glycol and adipic acid having an OH number of 56,
251 parts of the allophanate diisocyanate solution according to Example 4(A)
243 parts of 2,4-diisocyanatotoluene
39 parts of diaminoethane
3800 parts of water.

The dispersion thus obtained has a solids content of about 40%. The solid contains about 6.73% of ethylene oxide incorporated within lateral polyether chains.

Following the procedure of Example 2, moldings are produced from the dispersions according to Examples 3 and 4 and subjected to the conditions and tests described therein. The molding according to Example 3 behaves in the same way as the molding according to Example 1, i.e., does not show any surface coating, whereas the molding according to Example 4 undergoes the same surface changes as the molding according to Example 2.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. Non-ionic, water-dispersible polyurethanes produced using an isocyanate group to isocyanate-reactive group equivalent ratio of from about 0.8:1 to 2.5:1 having a substantially linear molecular structure and about 3 to 30% by weight, based on the weight of the polyurethane, of lateral polyalkylene oxide polyether chains containing ethylene oxide units which are responsible for dispersibility, wherein from about 40 to 95% of the alkylene oxide units of the lateral polyalkylene oxide polyether chains, based on the number of alkylene oxide units, consist of ethylene oxide units and from about 5 to 60% are selected from the group consisting of propylene oxide, butylene oxide and styrene oxide units.

2. Aqueous dispersions of the polyurethanes claimed in claim 1.

3. A process for producing water-dispersible polyurethanes having a substantially linear molecular structure and about 3 to 30% by weight, based on weight of the polyurethane, of lateral polyalkylene oxide polyether chains by reacting organic diisocyanates with difunctional organic compounds ("difunctional" in the context of the isocyanate polyaddition reaction) containing terminal isocyanate-reactive hydrogen atoms and having a molecular weight of from about 300 to 6000 in the presence of synthesis components containing hydrophilic groups which guarantee the dispersibility of the polyurethanes and optionally in the presence of chain extenders having a molecular weight below about 300 known in polyurethane chemistry and optionally in the presence of the aids and additives commonly used in polyurethane chemistry, wherein the synthesis components containing hydrophilic groups are diols corresponding to the following general formula:

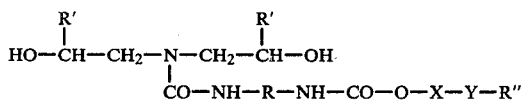

and/or diisocyanates corresponding to the following general formula:

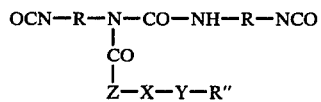

wherein
R—represents a difunctional radical of the type obtained by removing the isocyanate groups from a diisocyanate having a molecular weight of from about 112 to 1000,
R'—represents a hydrogen atom or a monofunctional hydro-carbon radical having from 1 to 8 carbon atoms,
X—represents a difunctional radical obtained by removing the terminal oxygen atom from a polyalkylene oxide radical having from about 5 to 90 alkylene oxide units, of which, based on the number thereof, from about 40 to 95% consist of ethylene oxide units and from about 5 to 60% are selected from the group consisting of propylene oxide, butylene oxide and styrene oxide units,
Y—represents oxygen or —NR'''—,
R'' and R''' which may be the same or different, each represent monofunctional hydrocarbon radicals having from 1 to 12 carbon atoms, and
Z—represents a radical which has the same definition as Y
and wherein the equivalent ratio of isocyanate groups to isocyanate-reactive groups is from about 0.8:1 to 2.5:1.

4. A process for the production of a non-ionic water-dispersible polyurethane having a substantially linear molecular structure comprising reacting in an equivalent ratio of isocyanate groups to isocyanate-reactive groups of from about 0.8:1 to 2.5:1:
(a) organic diisocyanates,
(b) organic difunctional compounds having isocyanate-reactive end groups and having a molecular weight of from about 300 to 6000, and
(c) synthesis components containing hydrophilic groups which are responsible for the dispersibility of the polyurethane, said synthesis components selected from the group consisting of diols of the formula

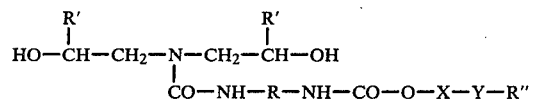

and diisocyanates of the formula

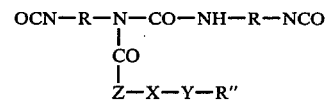

wherein
R—represents a difunctional radical of the type obtained by removing the isocyanate groups from a diisocyanate having a molecular weight of from about 112 to 1000,
R'—represents a hydrogen atom or a monofunctional hydrocarbon radical having from 1 to 8 carbon atoms,
X—represents a difunctional radical obtained by removing the terminal oxygen atom from a polyalkylene oxide radical having from about 5 to 90 alkylene oxide units, of which, based on the number thereof, from about 40 to 95% consist of ethylene oxide units and from about 5 to 60% consist of the alkylene oxide units selected from the group consisting of propylene oxide, butylene oxide and styrene oxide units,
Y—represents oxygen or —NR'''—,
R'' and R''', which may be the same or different, each represent monofunctional hydrocarbon radicals having from 1 to 12 carbon atoms, and
Z—represents a radical which has the same definition as Y,
so as to produce a polyurethane which contains from about 3 to 30% by weight of lateral polyalkylene polyether chains.

5. The process of claim 4 wherein X represents a difunctional polyalkylene oxide radical having from about 20 to 70 alkylene oxide units, of which, based on the number thereof, from about 60 to 90% consist of ethylene oxide units and from about 10 to 40% consist of alkylene oxide units selected from the group consisting of propylene oxide, butylene oxide and styrene oxide units.

6. The process of claim 4 wherein chain extenders having a molecular weight below about 300 are used.

7. The process of claim 4 wherein the organic difunctional compounds having isocyanate-reactive end groups are selected from the group of compounds consisting of dihydroxy polyesters, dihydroxy polylactones, dihydroxy polyethers and dihydroxy polycarbonates.

8. The aqueous dispersions of claim 2 wherein the average particle size is from about 10 m$\mu$ to 5$\mu$.

9. Non-ionic, water-dispersible polyurethanes produced using an isocyanate group to isocyanate-reactive group equivalent ratio of from about 0.95:1 to 1.5:1 having a substantially linear molecular structure and about 3 to 30% by weight, based on the weight of the polyurethane, of lateral polyalkylene oxide polyether chains containing ethylene oxide units which are responsible for dispersibility, wherein from about 40 to 95% of the alkylene oxide units of the lateral polyalkylene oxide polyether chains, based on the number of alkylene oxide units, consist of ethylene oxide units and from about 5 to 60% are selected from the group consisting of propylene oxide, butylene oxide and styrene oxide units, said alkylene oxide units contributed by synthesis components selected from the group consisting of diols of the formula

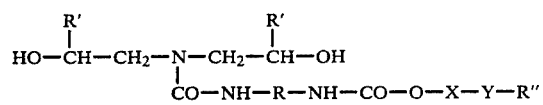

and diisocyanates of the formula

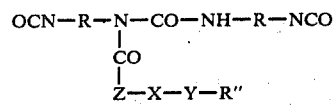

wherein
R—represents a difunctional radical of the type obtained by removing the isocyanate groups from a diisocyanate having a molecular weight of from about 112 to 1000,
R'—represents a hydrogen atom or a monofunctional hydrocarbon radical having from 1 to 8 carbon atoms,
X—represents a difunctional radical obtained by removing the terminal oxygen atom from a polyalkylene oxide radical having from about 5 to 90% alkylene oxide units, of which, based on the number thereof, from about 40 to 95% consist of ethylene oxide units and from about 5 to 60% consist of the alkylene oxide units selected from the group consisting of propylene oxide, butylene oxide and styrene oxide units,
Y—represents oxygen or —NR'''—,
R'' and R''', which may be the same or different, each represent monofunctional hydrocarbon radicals having from 1 to 12 carbon atoms, and
Z—represents a radical which has the same definition as Y.

* * * * *

UNITED STATES PATENT AND TRADEMARK OFFICE
CERTIFICATE OF CORRECTION

PATENT NO. : 4190566

DATED : February 26, 1980

INVENTOR(S) : Klaus Noll and Josef Pedain

It is certified that error appears in the above-identified patent and that said Letters Patent are hereby corrected as shown below:

On the first page of the patent, Applicants' claim for priority should be acknowledged by addition of the following:

[30] Foreign Application Priority
December 10, 1975 [DE] Fed. Rep. of Germany...2555534

At column 9, line 34, please correct the spelling of "porcelain".

At column 10, line 41, please correct the spelling of "having".

Signed and Sealed this

Seventeenth Day of March 1981

[SEAL]

Attest:

RENE D. TEGTMEYER

Attesting Officer

Acting Commissioner of Patents and Trademarks